US011019131B2

(12) United States Patent
Jang (10) Patent No.: US 11,019,131 B2
(45) Date of Patent: May 25, 2021

(54) METHOD AND SYSTEM OF FILE TRANSFER USING DEVICE-TO-DEVICE COMMUNICATION TECHNIQUE IN MESSENGER

(71) Applicant: LINE Corporation, Tokyo (JP)

(72) Inventor: Hyukjae Jang, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 15 days.

(21) Appl. No.: 15/994,316

(22) Filed: May 31, 2018

(65) Prior Publication Data

US 2018/0367598 A1    Dec. 20, 2018

(30) Foreign Application Priority Data

Jun. 16, 2017  (KR) .......................... 10-2017-0076594

(51) Int. Cl.
*H04L 29/08*       (2006.01)
*H04L 12/58*       (2006.01)
(Continued)

(52) U.S. Cl.
CPC .............. *H04L 67/06* (2013.01); *H04L 51/10* (2013.01); *H04L 63/0492* (2013.01);
(Continued)

(58) Field of Classification Search
CPC ......... H04L 29/00; H04L 29/02; H04L 51/00; H04L 51/04–046; H04L 51/08–10;
(Continued)

(56) References Cited

U.S. PATENT DOCUMENTS 7,487,248 B2 *   2/2009   Moran ................... H04L 67/14
                                                            709/206
7,561,691 B2 *   7/2009   Blight ................... H04L 63/08
                                                            380/247
(Continued)

FOREIGN PATENT DOCUMENTS

KR       2002-0074304 A      9/2002
KR       10-1631289 B1       6/2016
KR       2016-0138898 A     12/2016

OTHER PUBLICATIONS

Bluetooth Specification Version 5—vol. 1—Part A—Dec. 2016—pp. 230-239.*

*Primary Examiner* — Boris D Grijalva Lobos
(74) *Attorney, Agent, or Firm* — Harness, Dickey & Pierce, P.L.C.

(57) ABSTRACT

A file transfer method including forwarding, by a first electronic device connected to a communication session of a messaging service, a first message including an identifier of the first electronic device to a second electronic device connected to the communication session through the communication session, in response to selecting a file to be transferred through the communication session, receiving a second message including an identifier of the second electronic device forwarded through the communication session from the second electronic device, in response to the first message, attempting to set a device-to-device communication with the second electronic device using the identifier of the second electronic device, and transferring the selected file to the second electronic device through the set device-to-device communication when the device-to-device communication is set and transferring the selected file to the second electronic device through the communication session when the device-to-device communication is not set.

17 Claims, 8 Drawing Sheets

(51) Int. Cl.
*H04L 29/06* (2006.01)
*H04W 4/12* (2009.01)
*H04W 12/00* (2021.01)
*H04W 76/14* (2018.01)
*H04W 12/50* (2021.01)
*H04W 4/80* (2018.01)
*H04W 8/00* (2009.01)

(52) U.S. Cl.
CPC ............. *H04W 4/12* (2013.01); *H04W 12/50* (2021.01); *H04W 76/14* (2018.02); *H04W 4/80* (2018.02); *H04W 8/005* (2013.01)

(58) Field of Classification Search
CPC ......... H04L 51/28; H04L 51/32; H04L 63/00; H04L 63/04; H04L 63/0428; H04L 63/0485; H04L 63/0492; H04L 63/10; H04L 65/00; H04L 65/40; H04L 65/4007; H04L 67/00; H04L 67/06; H04L 67/14; H04L 67/141; H04L 67/30; H04L 67/303; H04W 4/00; H04W 4/12; H04W 4/80; H04W 8/005; H04W 12/003; H04W 76/00–14
See application file for complete search history.

(56) References Cited

U.S. PATENT DOCUMENTS

| | | | | |
|---|---|---|---|---|
| 8,150,416 B2* | 4/2012 | Ribaudo | ............... | G01S 5/0018 370/338 |
| 8,689,307 B2* | 4/2014 | Chaturvedi | ....... | H04L 29/08846 726/8 |
| 8,725,123 B2* | 5/2014 | Raleigh | ................. | H04L 41/046 455/414.1 |
| 8,774,721 B2* | 7/2014 | Hertel | .................... | H04W 76/14 455/41.3 |
| 8,918,232 B2* | 12/2014 | Lavi | ........................ | G07C 5/008 701/2 |
| 9,084,078 B2* | 7/2015 | Flanagan | ............... | H04W 4/023 |
| 9,137,267 B2* | 9/2015 | Patel | .................... | H04L 65/1006 |
| 9,226,147 B2* | 12/2015 | Brander | ................. | H04L 51/04 |
| 9,237,172 B2* | 1/2016 | Yu | ........................ | H04L 65/1043 |
| 9,654,960 B2* | 5/2017 | Zhou | .................... | H04W 76/14 |
| 10,320,915 B2* | 6/2019 | Agiwal | .................. | H04L 67/14 |
| 10,375,743 B1* | 8/2019 | Rathnam | ............. | H04L 63/0807 |
| 10,440,002 B2* | 10/2019 | Ayatsuka | ................ | G06F 21/31 |
| 10,484,160 B2* | 11/2019 | Morita | .................. | H04W 76/14 |
| 2005/0273609 A1* | 12/2005 | Eronen | ............... | H04L 63/0428 713/171 |
| 2006/0253541 A1* | 11/2006 | Kim | ........................ | H04L 51/04 709/207 |
| 2009/0034731 A1* | 2/2009 | Oshima | ................. | G06F 21/608 380/270 |
| 2009/0052348 A1* | 2/2009 | Kato | .................... | H04L 63/0492 370/254 |
| 2009/0209202 A1* | 8/2009 | Martini | ................. | H04W 12/02 455/41.2 |
| 2011/0210831 A1* | 9/2011 | Talty | ........................ | H04W 4/21 340/10.51 |
| 2011/0255692 A1* | 10/2011 | Soliman | ............... | H04L 63/0492 380/270 |
| 2012/0045994 A1* | 2/2012 | Koh | ..................... | H04L 63/0492 455/41.3 |
| 2013/0102250 A1* | 4/2013 | Mutikainen | ............. | H04W 4/00 455/41.2 |
| 2013/0223399 A1* | 8/2013 | Lu | ......................... | H04W 76/14 370/329 |
| 2013/0281014 A1* | 10/2013 | Frankland | ................ | H04B 5/00 455/41.1 |
| 2014/0004793 A1* | 1/2014 | Bandyopadhyay | .......................... | H04L 63/0428 455/41.1 |
| 2014/0137197 A1* | 5/2014 | Lazaridis | ............ | H04L 63/0492 726/3 |
| 2014/0148094 A1* | 5/2014 | Park | ........................ | G06Q 50/01 455/41.1 |
| 2014/0179276 A1* | 6/2014 | Kang | .................. | H04W 12/04 455/411 |
| 2014/0185587 A1* | 7/2014 | Jang | .................. | H04W 36/0005 370/331 |
| 2014/0370879 A1* | 12/2014 | Redding | ........... | H04M 3/42178 455/419 |
| 2015/0032792 A1* | 1/2015 | Khan | .................... | H04B 5/0031 709/201 |
| 2015/0039776 A1* | 2/2015 | Jarnagin, III | ......... | H04L 67/141 709/228 |
| 2015/0081837 A1* | 3/2015 | Bernier | .................... | H04W 8/24 709/217 |
| 2015/0133112 A1* | 5/2015 | Wang | ..................... | H04W 76/14 455/426.1 |
| 2015/0334515 A1* | 11/2015 | Hiltgen | .................... | H04W 4/80 455/41.1 |
| 2015/0350812 A1* | 12/2015 | Hu | .................. | H04M 1/274516 455/41.1 |
| 2015/0373485 A1* | 12/2015 | Chung | .................. | H04W 48/10 455/41.2 |
| 2016/0150357 A1* | 5/2016 | Jung | .................. | H04W 52/0206 455/41.1 |
| 2016/0198455 A1* | 7/2016 | Caretti | .................. | H04B 17/318 370/329 |
| 2016/0198518 A1* | 7/2016 | Baek | ..................... | H04W 24/10 370/329 |
| 2016/0315923 A1* | 10/2016 | Riscombe-Burton | ........................ | H04L 63/10 |
| 2016/0316503 A1* | 10/2016 | Raphael | ................ | H04L 67/306 |
| 2016/0366538 A1* | 12/2016 | Agarwal | ................ | H04W 4/80 |
| 2017/0288870 A1* | 10/2017 | Przydatek | ............. | H04L 63/06 |
| 2018/0070199 A1* | 3/2018 | Buck | ................... | H04W 4/80 |
| 2018/0098364 A1* | 4/2018 | Meads | ................... | H04L 67/02 |

* cited by examiner

METHOD AND SYSTEM OF FILE TRANSFER USING DEVICE-TO-DEVICE COMMUNICATION TECHNIQUE IN MESSENGER

CROSS-REFERENCE TO RELATED APPLICATION(S)

This application claims priority under 35 U.S.C. § 119 to Korean Patent Application No. 10-2017-0076594 filed on Jun. 16, 2017, in the Korean Intellectual Property Office (KIPO), the entire contents of which are incorporated herein by reference.

BACKGROUND

Field

One or more example embodiments relate to methods and/or systems for transferring a file using a device-to-device communication technique in a messenger.

Description of Related Art

An instant messenger is a communication tool, and refers to a software program or application capable of transferring and receiving messages or data in real time. Through the instant messenger, a user may register a contact and may transfer and receive messages to and from a counterpart user on a contact list.

Such a messenger function is common in a mobile environment of a mobile communication terminal as well as a personal computer (PC). For example, a mobile messenger service system and a method of a mobile terminal using a wireless communication network to provide a messenger service between mobile messengers each installed on a mobile terminal are disclosed in Korean Patent Laid-Open Publication NO. 10-2002-0074304 published on Sep. 30, 2002.

In a messenger application, a file transfer between users is generally many performed through a messenger server. However, in some countries or regions, the network infrastructures and/or mobile network situations may be poor. Further, wireless routers, for example, wireless fidelity (WiFi) access points (Aps) may be standardized. Accordingly, there are some constraints and difficulties in transferring files between individual users.

SUMMARY

One or more example embodiments provide methods and/or systems that may transfer a file using a device-to-device communication technique to perform a file transfer in a messenger.

One or more example embodiments also provide method and/or systems that may directly transfer a file between devices without going through a messenger server.

According to an aspect of at least one example embodiment, a file transfer method includes forwarding, by a first electronic device connected to a communication session of a messaging service, a first message including an identifier of the first electronic device to a second electronic device connected to the communication session through the communication session, in response to selecting a file to be transferred through the communication session, receiving, by the first electronic device, a second message including an identifier of the second electronic device, the second message being forwarded through the communication session from the second electronic device in response to the first message, attempting, by the first electronic device, to set a device-to-device communication with the second electronic device using the identifier of the second electronic device, and transferring, by the first electronic device, the selected file to the second electronic device through the set device-to-device communication in response to the device-to-device communication being set, and transferring the selected file to the second electronic device through the communication session in response to the device-to-device communication not being set.

The attempting may include broadcasting the identifier of the first electronic device for the device-to-device communication with the second electronic device.

The method may further include retrieving, by the second electronic device, the first electronic device from a list of devices capable of performing the device-to-device communication using the identifier included in the first message, requesting, by the second electronic device, the first electronic device for a device-to-device communication, and the attempting may include automatically accepting the request for the device-to-device communication from the second electronic device using the identifier included in the second message.

The method may further include requesting, by the second electronic device, the first electronic device for a device-to-device communication using the identifier included in the first message, and the attempting may include automatically accepting the request for the device-to-device communication from the second electronic device in response to the identifier included in the second message matching device information that requests the device-to-device communication.

The transferring the selected file to the second electronic device through the communication session may include forwarding the selected file to the second electronic device through the communication session in response to the device-to-device communication not being set during a time period.

The first message and the second message may be processed as hidden information.

According to an aspect of at least one example embodiment, there is provided a non-transitory computer-readable recording medium storing instructions that, when executed by a processor, cause the processor to implement a file transfer method in conjunction with an electronic device. The file transfer method includes forwarding a first message including an identifier of a first electronic device connected to a communication session of a messaging service to a second electronic device connected to the communication session of the messaging service through the communication session of the messaging service in response to selecting a file to be transferred through the communication session, receiving a second message including an identifier of the second electronic device, the second message being forwarded through the communication session from the second electronic device in response to the first message, attempting to set a device-to-device communication between the first electronic device and the second electronic device using the identifier of the second electronic device, and transferring the selected file to the second electronic device through the set device-to-device communication in response to the device-to-device communication being set, and transferring the selected file to the second electronic device through the communication session in response to the device-to-device communication not being set.

According to an aspect of at least one example embodiment, a file transfer system of an electronic device includes a memory configured to store computer-readable instructions and at least one processor configured to execute computer-readable instructions such that the at least one processor is configured to forward a first message including an identifier of a first electronic device connected to a communication session of a messaging service to a second electronic device connected to the communication session of the messaging service through the communication session of the messaging service in response to selecting a file to be transferred through the communication session, receive a second message including an identifier of the second electronic device, is the second message being forwarded through the communication session from the second electronic device in response to the first message, attempt to set a device-to-device communication with the second electronic device using the identifier of the second electronic device, and a file transferor configured to transfer the selected file to the second electronic device through the set device-to-device communication in response to the device-to-device communication being set, and transfer the selected file to the second electronic device through the communication session in response to the device-to-device communication not being set.

According to some example embodiments, when users present in a near distance attempt a file transfer in a messenger, a file may be transferred using a device-to-device communication technique. Thus, the messenger may transfer the file between devices directly without going through a messenger server, thereby reducing server load in terms of network cost and/or storage cost.

Also, according to some example embodiments, because a device-to-device communication technique is used for file transfer in a messenger, a file transfer rate may be enhanced compared to a file transfer scheme via a server. In addition, because paid data is not used, communication cost may be saved and the messenger may overcome the constraint with regard to a transfer file size.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," or "upper" may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to" another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, or block diagrams) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, or a microprocessor, the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (e.g., a disk drive, or solid state (e.g., NAND flash) device), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations (e.g., parallel processors) may be possible.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a technique for transferring a file using a device-to-device communication technique in a messenger, and more particularly, to a method and system that may transfer a file using a device-to-device communication technique when a user attempts to transfer a file to a conversation partner present around using a messenger.

The example embodiments disclosed herein may use device-to-device communication techniques for a file transfer in a messenger, and may improve efficiency, convenience, readiness, cost saving, and the like.

Figure 1:
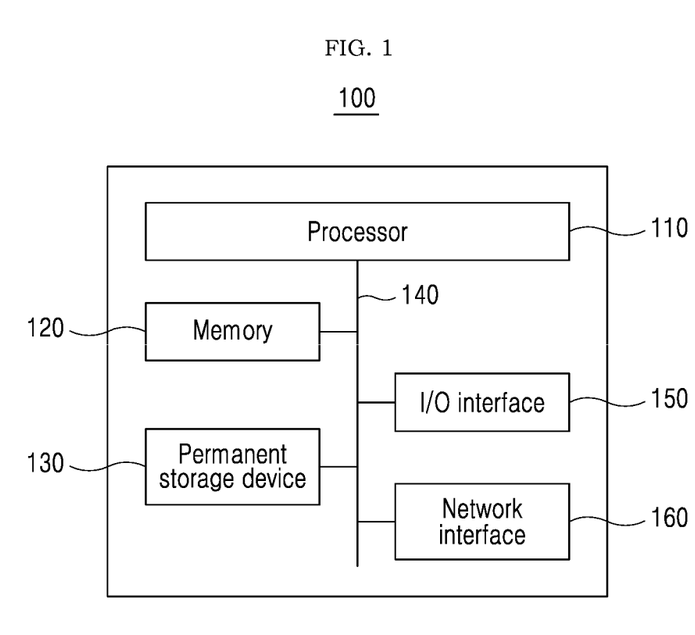
FIG. 1 is a diagram illustrating an example of a configuration of a computer system according to at least one example embodiment.

FIG. 1 is a diagram illustrating an example of a configuration of a computer system according to at least one example embodiment. For example, a file transfer system according to the example embodiments may be configured through a computer system 100 of FIG. 1. Referring to FIG. 1, the computer system 100 may include a processor 110, a memory 120, a permanent storage device 130, a bus 140, an input/output (I/O) interface 150, and a network interface 160.

The processor 110 may include a device capable of processing a sequence of instructions or may be a part of such a device. The processor 110 may include, for example, a computer processor, a processor within a mobile device or another electronic device, and/or a digital processor. The processor 110 may be included in, for example, a server computing device, a server computer, a series of server computers, server farm, a cloud computer, a content platform, a mobile computing device, a smartphone, a tablet, or a set-top box. The processor 110 may be connected to the memory 120 through the bus 140.

The memory 120 may include a volatile memory, a permanent memory, a virtual memory, and/or other types of memories that may store information used by the computer system 100 or output from the computer system 100. The memory 120 may include, for example, random access memory (RAM) and/or dynamic RAM (DRAM). The memory 120 may be used to store information such as state information of the computer system 100. The memory 120 may be used to store instructions of the computer system 100 that includes instructions for controlling a face recognition camera. The computer system 100 may include one or more processors 110 if desired.

The bus 140 may include a communication-based structure that enables interaction between various components of the computer system 100. The bus 140 may convey data between the components of the computer system 100, for example, between the processor 110 and the memory 120. The bus 140 may include wireless and/or wired communication media between the components of the computer system 100, and may include parallel, serial, or other topology arrangements.

The permanent storage device 130 may include components, such as a memory or another permanent storage device, used by the computer system 100 to store data during a longer period than the memory 120. The permanent storage device 130 may include a non-volatile main memory such as used by the processor 110 included in the computer system 100. The permanent storage device 130 may include, for example, flash memory, hard disk, optical disk, or other computer-readable media.

The I/O interface 150 may include a keyboard, a mouse, a voice command input, a display, and/or interfaces associated with input or output devices. Configuration instructions and/or input associated with a face recognition camera may be received through the I/O interface 150.

The network interface 160 may include one or more interfaces associated with networks (e.g., the Internet or near field networks). The network interface 160 may include interfaces associated with wired or wireless connections. The configuration instructions may be received through the network interface 160. Information associated with the face recognition camera may be received or transferred through the network interface 160.

According to other example embodiments, the computer system 100 may include additional components that are not shown in FIG. 1. However, there is no need to illustrate such additional components because those components are well-known to those having ordinary skill in the related art. For example, the computer system 100 may be configured to include at least a portion of I/O devices connected to the I/O interface 150 or further include other components, such as a transceiver, a global positioning system (GPS) module, a camera, various sensors, and/or a database. For example, if the computer system 100 is configured in a form of a mobile device (e.g., a smartphone), the computer system 100 may be configured to further include various components, for example, a camera, an acceleration sensor or a gyro sensor, various types of physical buttons, a button using a touch panel, an I/O port, and/or a vibrator for vibration, which are desired in the mobile device.

Figure 2:
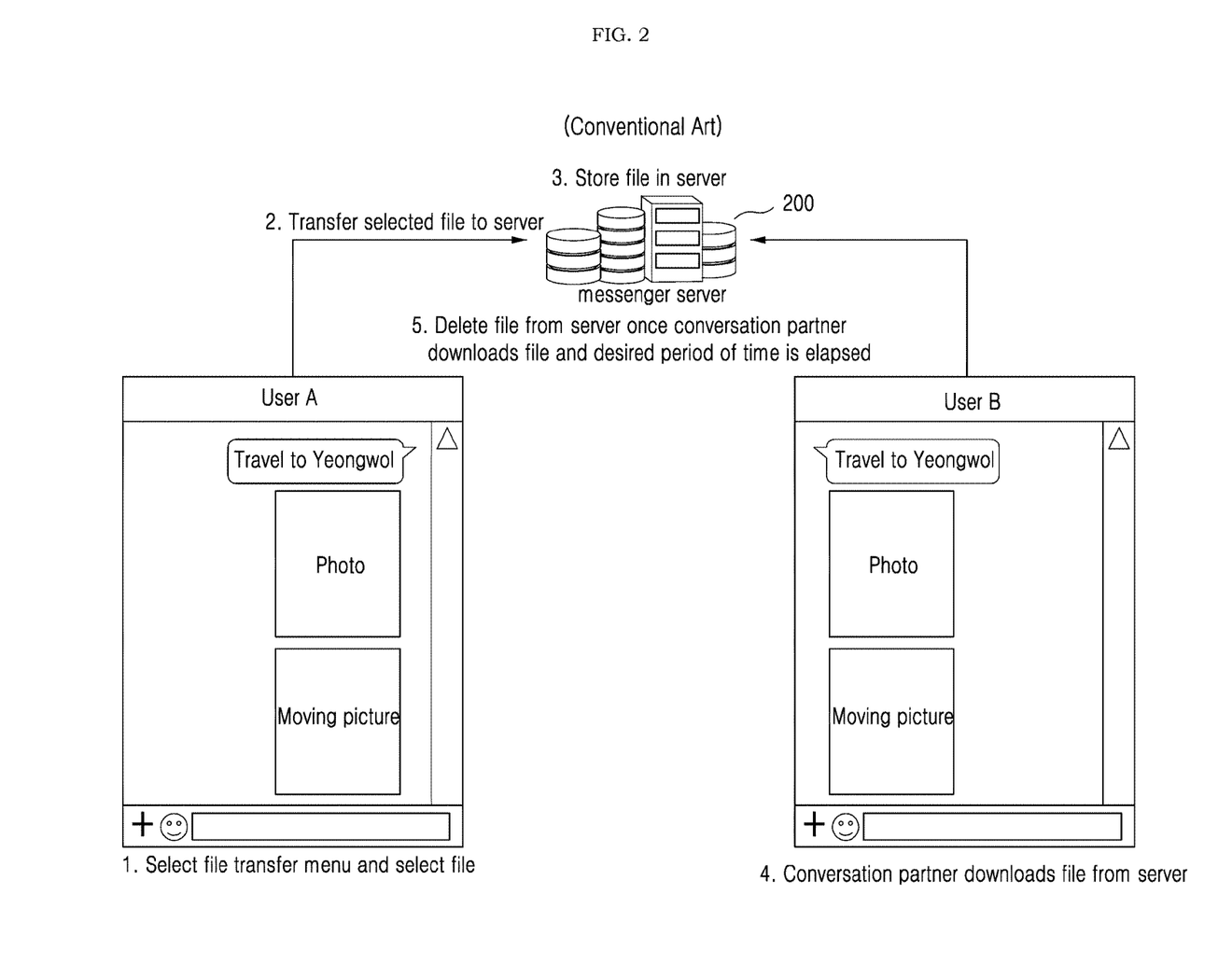
FIG. 2 illustrates an example of a basic technical scenario for a file transfer in a messenger.

FIG. 2 illustrates an example of a basic technical scenario for a file transfer in a messenger. FIG. 2 illustrates an example of a process of transferring and receiving a file between a user A and a user B through a messenger.

1. The user A executes a messenger installed on a terminal, selects a file transfer menu in a chatroom with the user B, and selects a file to be transferred to the user B.

2. The terminal of the user A transfers the file selected by the user A to a messenger server 200 in response to a file transfer request of the messenger.

3. The messenger server 200 receives the file to be transferred to the user B from the terminal of the user A and stores the received file in a file database.

4. A terminal of the user B that is a conversation partner downloads the file transferred from the user A from the messenger server 200 through the chatroom with the user A in the messenger 5. The messenger server 200 maintains the file transferred by the user A, and once the user B downloads the file and a desired period of time is elapsed, deletes the file from the file database.

A file transfer between individuals in the messenger is basically performed through the messenger server 200. According to an example embodiment, file transfer methods and/or file transfer systems are provided to transfer a file using a device-to-device communication technique without going through the messenger server 200 when a user attempts a file transfer in the messenger and a conversation partner is present in a near distance from the user.

The term "device-to-device communication" used herein indicates a direct communication between devices present in a near distance without using propagation relay equipment. For example, the device-to-device communication technique may include direct communication techniques between terminals using wireless fidelity (WiFi) direct, Bluetooth, ZigBee, ultra wideband (UWB), or the like.

Figure 3:
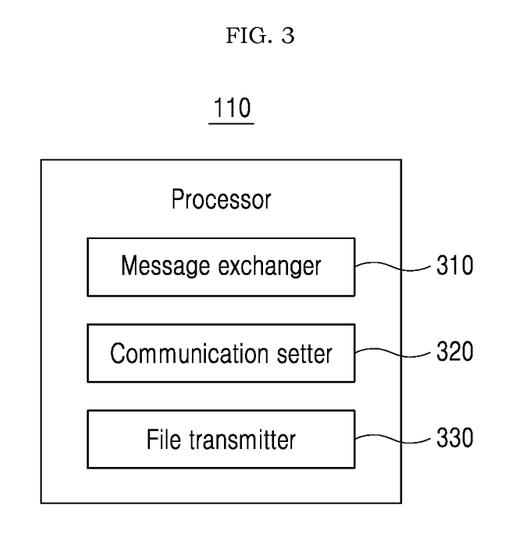
FIG. 3 is a block diagram illustrating an example of components includable in a processor of a computer system according to at least one example embodiment.
Figure 4:
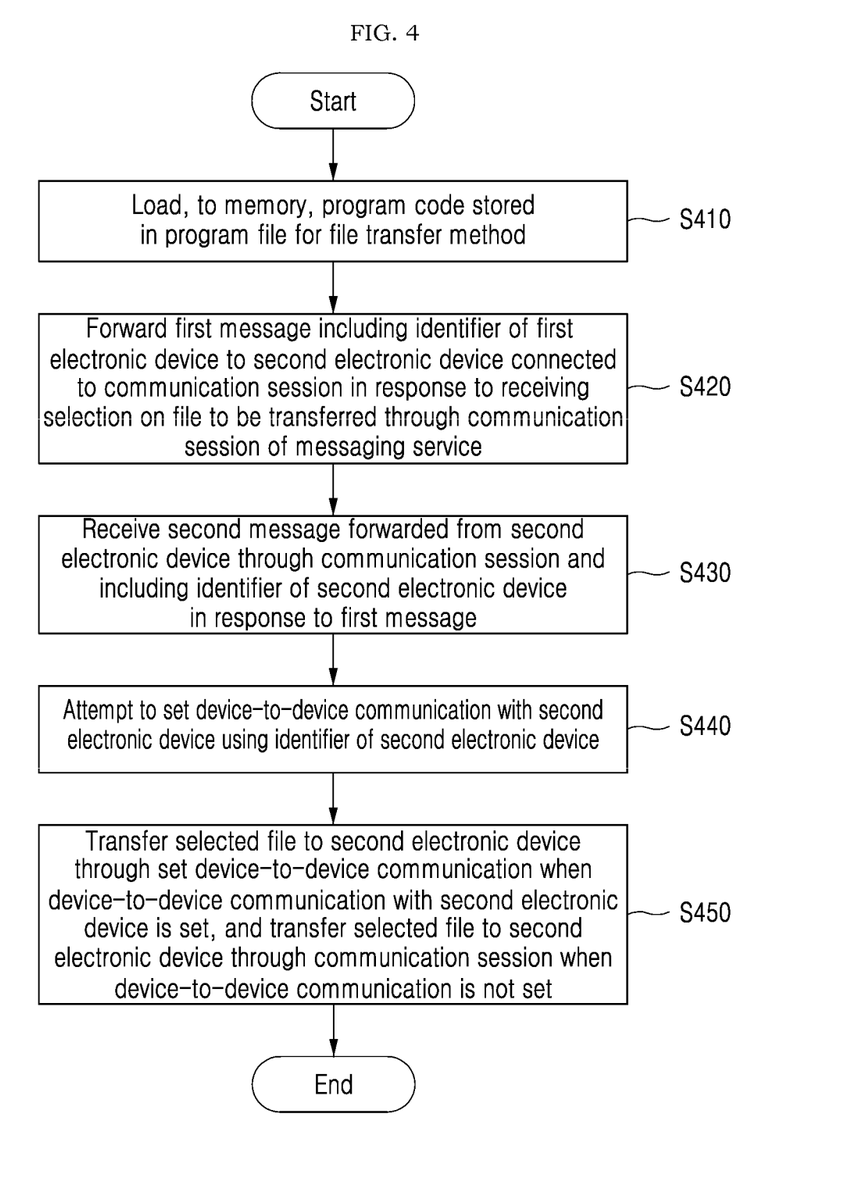
FIG. 4 is a flowchart illustrating a method of a file transfer method performed by a computer system according to at least one example embodiment.

FIG. 3 is a block diagram illustrating an example of components includable in a processor of a computer system according to at least one example embodiment, and FIG. 4 is a flowchart illustrating a method of a file transfer method performed by a computer system according to at least one example embodiment.

The computer system 100 according to the example embodiments may be configured in a form of an electronic device, for example, a smartphone, a mobile phone, a tablet, a wearable device, a computer, a laptop computer, and the like, and may indicate an electronic device on which a messaging service application, for example, a messenger application, having a file transfer function is installed.

Referring to FIG. 3, the processor 110 may include a message exchanger 310, a communication setter 320, and a file transmitter 330. The components of the processor 110 may be representations of different functions that are performed by the processor 110 in response to a control instruction provided according to at least one program code. For example, the message exchanger 310 may be used as a functional representation of the processor 110 controlling the computer system 100 to exchange a message with other electronic devices. The processor 110 and the components of the processor 110 may be configured to execute instructions according to a code of an OS included in the memory 120 and at least one program code. Here, at least one program code may correspond to a code of a program configured to implement the file transfer method.

The file transfer method may not be implemented in illustrated order. A portion of operations included in the file transfer method may be omitted or an additional process may be further included in the file transfer method.

Referring to FIG. 4, in operation S410, the processor 110 may load, to the memory 120, a program code stored in a program file for the file transfer method. For example, the program file for the file transfer method may be stored in the permanent storage device 130 of FIG. 1. The processor 110 may control the computer system 100 to load, to the memory 120, the program code from the program file stored in the permanent storage device 130 through the bus 140. Here, the processor 110 and the message exchanger 310, the communication setter 320, and the file transmitter 330 included in the processor 110 may be different functional representations of the processor 110 to implement operations S410 through S450 by executing instructions of corresponding portions in the program code loaded to the memory 120. To implement operations S410 through S450, the processor 110 and the components of the processor 110 may directly process an operation or may control the computer system 100 in response to the control instruction.

In operation S420, in response to receiving, from a user of the computer system 100 (hereinafter, a first electronic device), a selection on a file to be transferred through a communication session of a messaging service provided from a messenger, the message exchanger 310 may forward a first message including an identifier of the first electronic device to an electronic device (hereinafter, a second electronic device) of a counterpart connected to the communication session through the communication session. Once the user of the first electronic device selects a file to be transferred to the counterpart through a file transfer function in a chatroom of the messenger, the message exchanger 310 may transfer the first message for a file transfer preparation to the second electronic device. Here, the first message may include, for example, a media access control (MAC) address or a device name, as information used to identify the first electronic device between devices. The message exchanger 310 may transfer the first message for the file transfer preparation to the second electronic device, and may also broadcast device information of the first electronic device desired for a device-to-device communication to peripheral devices.

In operation S430, the message exchanger 310 may receive a second message forwarded from the second electronic device through the communication session in response to the first message. Here, the second message may include, for example, a MAC address or a device name as information used to identify the second electronic device between devices. In response to receiving the first message for the file transfer preparation from the first electronic device through a communication session connected to the first electronic device on the messaging service, the second electronic device may transfer the second message including an identifier of the second electronic device to the first electronic device as a response message for a file reception preparation. Accordingly, the message exchanger 310 may receive the second message from the second electronic device as a response message to the first message.

In operation S440, the communication setter 320 may attempt to set a device-to-device communication with the second electronic device using the identifier of the second electronic device included in the second message. In response to receiving the first message for the file transfer preparation from the first electronic device, the second electronic device may automatically select a device that matches the identifier of the first electronic device included in the first message from the device information received through broadcasting as a peripheral device capable of performing a device-to-device communication, and may request the selected device for a communication channel connection. A request signal for the communication channel connection may include device information of the second electronic device required for the device-to-device communication. If the identifier of the second electronic device included in the second message is matched to the device information included in the request signal for the communication channel connection between devices, the communication setter 320 may automatically accept the connection request from the second electronic device, and may set the device-to-device communication with the second electronic device. For example, the communication setter 320 may set a time period for setting the device-to-device communication as, for example, 4 seconds, and may cancel the set device-to-device communication when the device-to-device communication channel with the second electronic device is not connected within the time period.

In operation S450, when the device-to-device communication with the second electronic device is set, the file transmitter 330 may transfer the file selected by the user to the second electronic device through the set device-to-device communication. When the device-to-device communication with the second electronic device is not set, the file transmitter 330 may transfer the file selected by the user to the second electronic device through the communication session connected to the second electronic device. That is, once the device-to-device communication channel with the second electronic device is connected, the file transmitter 330 may directly transfer the file selected by the user to the second electronic device using the corresponding communication channel. Here, if the set time period is elapsed based on a point in time at which the first message is transferred to the second electronic device or a point in time at which the second message is received from the second electronic device as the response message to the first message, the file transmitter 330 may cancel the setting of the device-to-device communication with the second electronic device, and may transfer the file selected by the user to the second electronic device through the communication session of the messaging service. In the case of the file transfer using the device-to-device communication, the file transfer is directly performed between devices. Accordingly, there is no limitation on a file size.

An overall procedure for setting the device-to-device communication may be performed in a hidden state without a user intervention. That is, the first message and the second message exchanged between the first electronic device and the second electronic device may be processed as hidden information that is not exposed to users participating in the chatroom provided by the messaging service.

Figure 5:
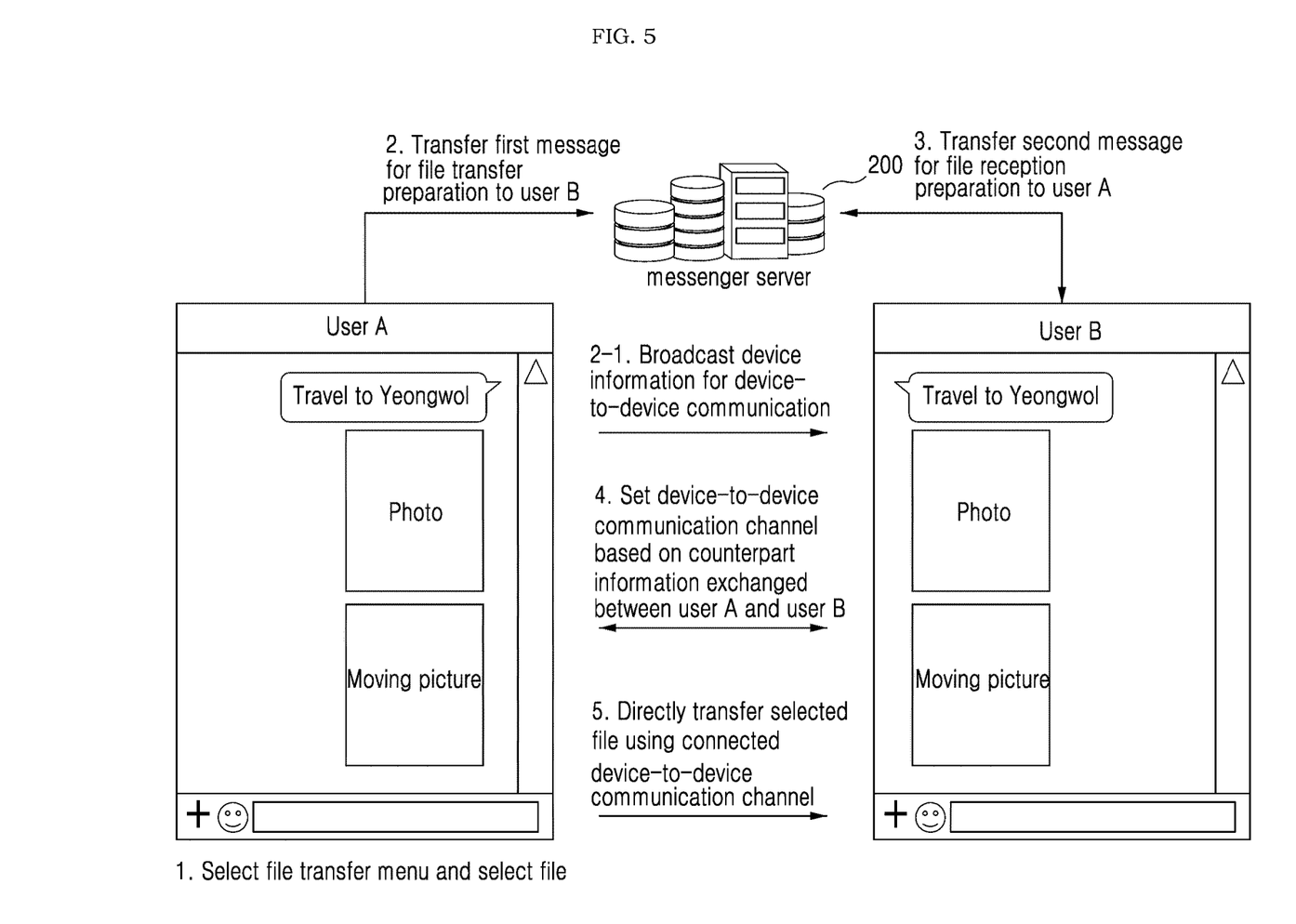
FIG. 5 illustrates an example of a technical scenario for transferring a file using a device-to-device communication in a messenger according to at least one example embodiment.

FIG. 5 illustrates an example of a technical scenario for transferring a file using a device-to-device communication in a messenger according to at least one example embodiment. FIG. 5 illustrates an example in which a user A transfers a file to a user B through a device-to-device communication in a messenger.

1. The user A executes a messenger installed on a terminal, selects a file transfer menu in a chatroom with the user B, and selects a file to be transferred to the user B.

2. The first electronic device that is the terminal of the user A transfers, to the messenger server 200, a first message including an identifier of the first electronic device for a file transfer preparation in response to the file being selected by the user A in the messenger. Here, the messenger server 200 receives the first message from the first electronic device and transfers the received first message to the second electronic device that is a terminal of the second user B.

2-1. The first electronic device starts to prepare a device-to-device communication by transferring the first message for the file transfer preparation to the second electronic device through the messenger server 200 and by broadcasting device information of the first electronic device desired for the device-to-device communication to peripheral devices.

3. Once the first message is received from the first electronic device, the second electronic device transfers, to the first electronic device, a second message including an identifier of the second electronic device through the messenger server 200 as a response to the first message.

4. The first electronic device and the second electronic device may extract counterpart information from the first message and the second message mutually exchanged through the messenger server 200, and may set a device-to-device communication channel based on the extracted counterpart information. Initially, the second electronic device may automatically select a device that matches the identifier of the first electronic device included in the first message from device information received through broadcasting, and may request the selected device for the device-to-device communication channel. When the identifier of the second electronic device included in the second message matches device information that requests the device-to-device communication channel connection, the first electronic device may automatically accept the connection request from the second electronic device, and may set the device-to-device communication with the second electronic device.

The second electronic device may receive the first message from the first electronic device, may retrieve the first electronic device from a list of peripheral devices capable of performing the device-to-device communication based on device information included in the first message, and may request the retrieved first electronic device for the device-to-device communication. At the same time, the second electronic device transfers, to the first electronic device, the second message including device information of the second electronic device through a communication session of the messaging service. Accordingly, the first electronic device may automatically accept the connection request from the second electronic device based on device information of the second electronic device included in the second, message and may set the device-to-device communication channel with the second electronic device.

5. Once the communication channel with the second electronic device is connected with respect to the file selected by the user A through the file transfer menu within the chatroom with the user B, the first electronic device may directly transfer the selected file to the second electronic device using the set device-to-device communication channel. Here, when the device-to-device communication channel with the second electronic device is not set during a time period, the first electronic device may transfer the file selected by the user A to the second electronic device through the messenger server 200.

According to some example embodiments, if a user that desires to transfer a file using a messaging service selects a file to be transferred to a counterpart, a file transfer side and a file reception side may exchange information associated with a device-to-device communication through a messenger server. Here, if the device-to-device communication is connectable through the exchanged information, the file transfer side and the file reception side may transfer and receive the file through the device-to-device communication. If the device-to-device communication is not set, the file transfer side and the file reception side may transfer and receive the file through the messenger server.

Figure 6:
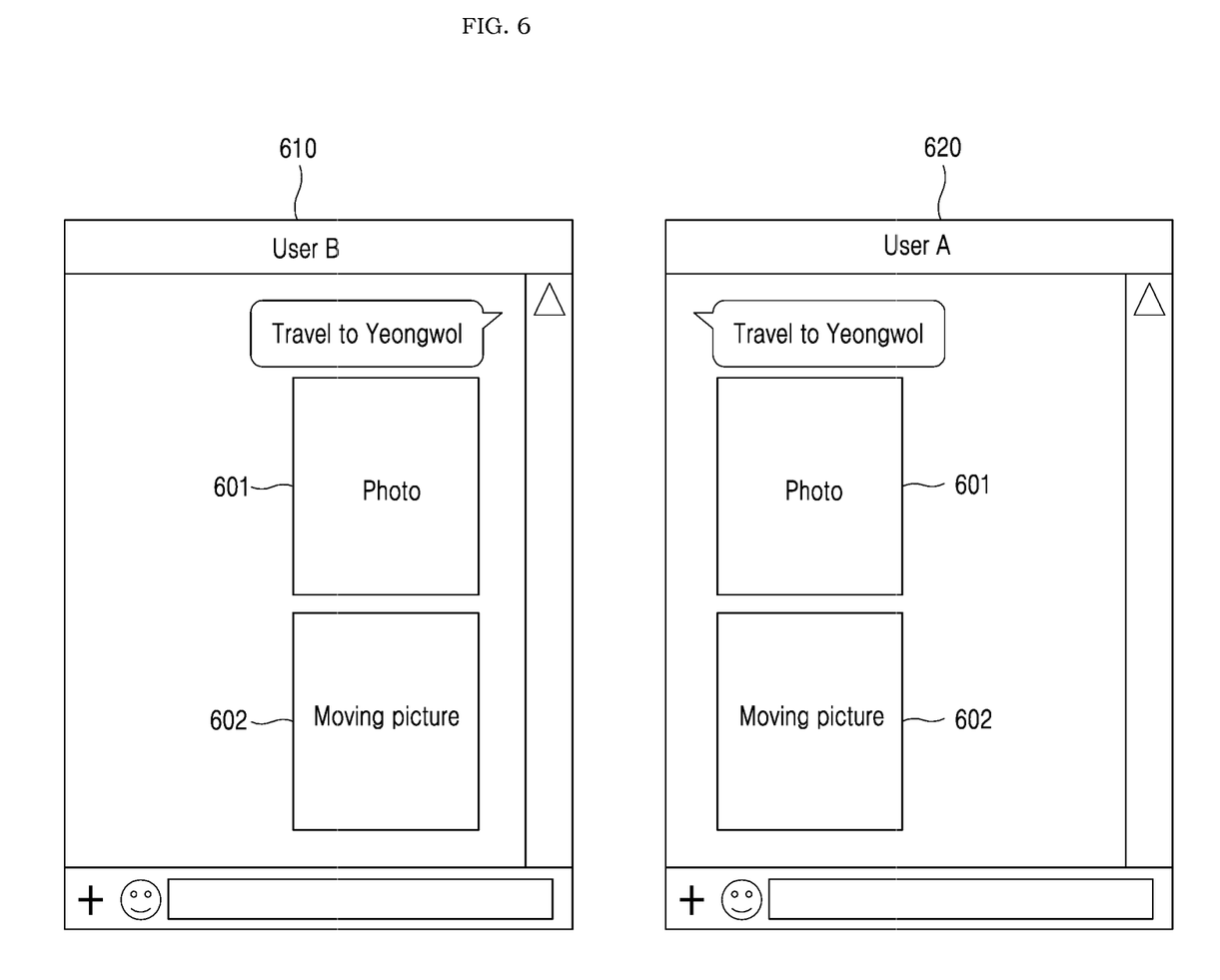
FIGS. 6 through 8 illustrate examples of a messenger screen including file transfer content according to at least one example embodiment.
Figure 7:
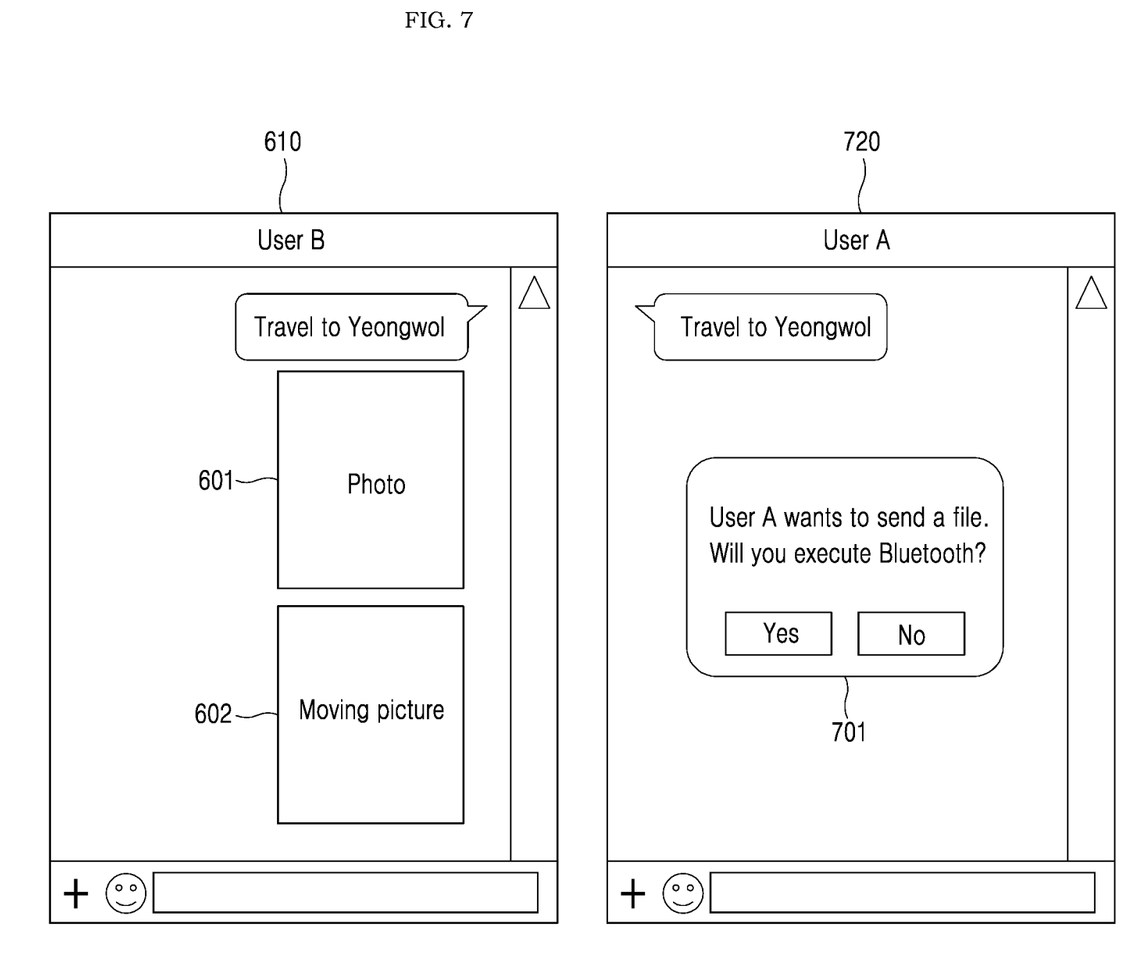
Figure 8:
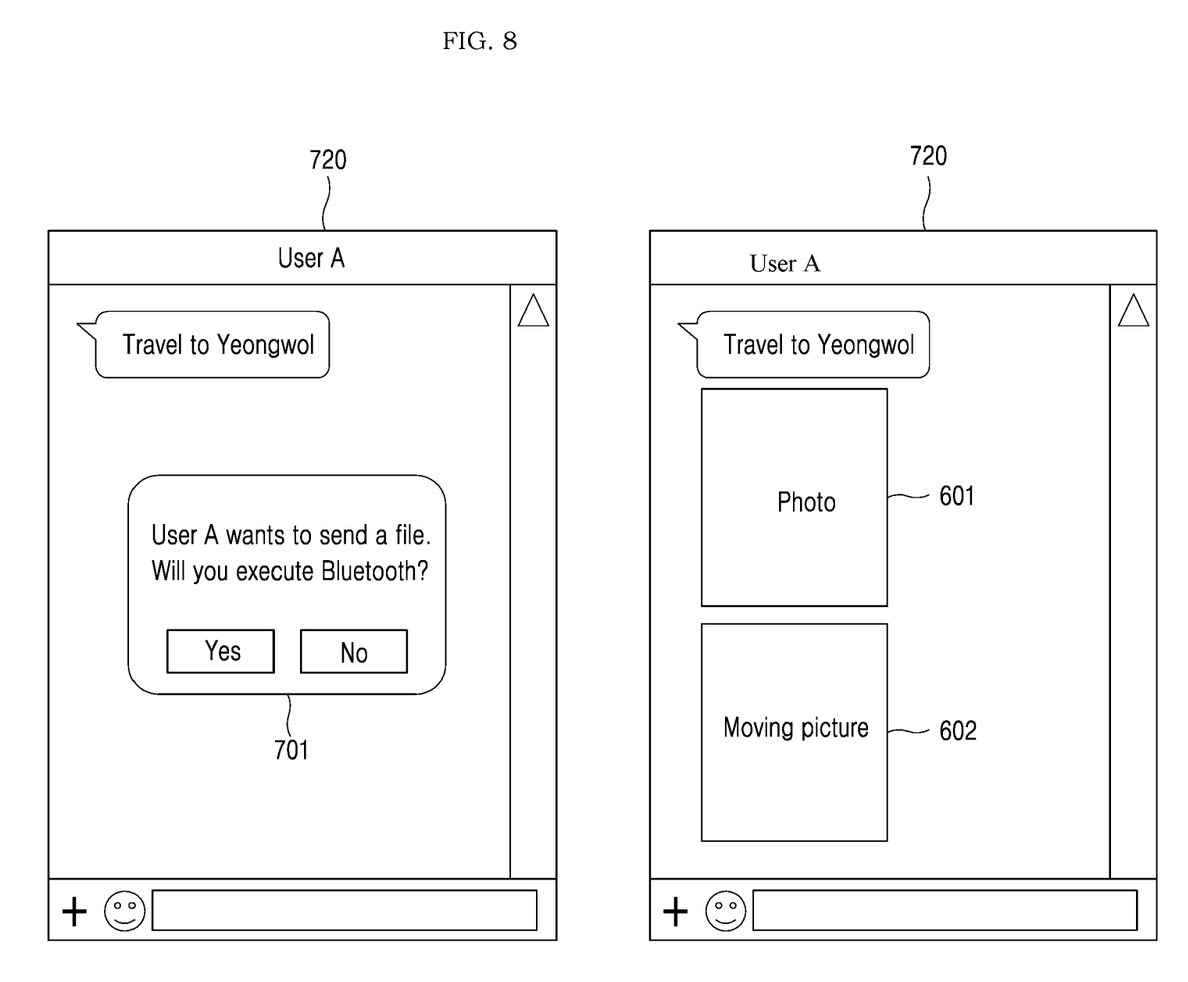

FIGS. 6 through 8 illustrate examples of a messenger screen including file transfer content according to at least one example embodiment.

FIG. 6 illustrates a chatroom screen 610 of a file transfer side and a chatroom screen 620 of a file reception side. A user A selects a file transfer menu on the chatroom screen 610 with a user B and selects files, for example, a photo 601 and a moving picture, 602 to be transferred to the user B. If the corresponding files 601 and 602 are transferred to the user B through a device-to-device communication, information about the files 601 and 602 may be displayed on the chatroom screen 620 of the file reception side.

Although the file transmission and reception is performed through the device-to-device communication, a user (e.g., a file transfer side) may have the same user experience as a file transfer method through a messenger server. According to some example embodiments, information associated with a counterpart device required desired device-to-device communication may be automatically verified through a messenger between both users. In addition, all the procedures for setting the device-to-device communication procedure may be performed in a hidden state. Thus, a user intervention or a user input may not be desired.

As another example, the file reception side may need a user intervention for accepting the device-to-device communication. Depending on cases, for example, based on terminal settings, the user intervention may be desired for some procedures. Referring to FIG. 7, once the user A selects the files 601 and 602 to be transferred to the user B using the file transfer menu on the chatroom 610 with the user B, the file transfer side may attempt to set the device-to-device communication with the file reception side. Here, if the device-to-device communication is blocked at the file reception side, for example, if Bluetooth is not executed, an input screen 701 requesting the user intervention may be displayed on a chatroom 720 with the user A. Referring to FIG. 8, if the user B unblocks the device-to-device communication through the input screen 701 in the chatroom 720 with the user A, for example, if the user B executes Bluetooth, the file reception side may receive the files 601 and 602 through the device-to-device communication with the file transfer side and information associated with the received files 601 and 602 may be displayed on the chatroom 720.

In the case of using a device-to-device communication to transfer a file in a messenger, a user may have an enhanced experience that a file is more quickly transferred if a counterpart is close to the user without additional cost. Also, in the case of using a direct communication between devices, a storage space for temporarily storing a file as well as network resources may not be used, which differs from an existing file transfer method using a communication network (e.g., the Internet).

According to some example embodiments, when users present in a near distance attempt a file transfer in a messenger, a file may be transferred using a device-to-device communication technique. Thus, the messenger may transfer the file between devices directly without going through a messenger server, thereby reducing server load (e.g., network cost and/or storage cost). Also, according to some example embodiments, because a device-to-device communication technique is used for file transfer in a messenger, a file transfer rate may be enhanced compared to a file transfer scheme via a server. In addition, since paid data is not used, communication cost may be saved, and the messenger may overcome the constraint with regard to a transfer file size.

The units described herein may be implemented using hardware components, software components, or a combination thereof. For example, a processing device may be implemented using one or more general-purpose or special purpose computers, such as a processor, a controller and an arithmetic logic unit, a digital signal processor, a microcomputer, a field programmable array, a programmable logic unit, a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment. The disclosed example embodiments may also be varied in many ways. Such variations are not to be regarded as a departure from the disclosure, and all such modifications are intended to be included within the scope of the disclosure.

What is claimed is:

1. A file transfer method comprising:
forwarding, by a first electronic device connected to a communication session of a messaging service, a first message including an identifier of the first electronic device to a second electronic device connected to the communication session through the communication session, in response to selecting a file to be transferred through the communication session;

retrieving, by the second electronic device, a specific identifier of the first electronic device from a list of peripheral devices capable of performing a device-to-device communication and stored in the second electronic device, using the identifier included in the first message;

receiving, by the first electronic device, both (i) a second message including an identifier of the second electronic device and (ii) a request signal requesting the device-to-device communication with the first electronic device, the second message and the request signal being forwarded through the communication session from the second electronic device at a same time in response to the first message;

attempting, by the first electronic device, to set the device-to-device communication with the second electronic device using the identifier of the second electronic device; and transferring, by the first electronic device, the selected file to the second electronic device through the set device-to-device communication in response to the device-to-device communication being set, and transferring the selected file to the second electronic device through the communication session in response to the device-to-device communication not being set, wherein the attempting comprises automatically accepting the request signal for the device-to-device communication from the second electronic device in response to the identifier included in the second message matching device information included in the request signal.

2. The method of claim 1, wherein the attempting comprises broadcasting the identifier of the first electronic device for the device-to-device communication with the second electronic device.

3. The method of claim 1, wherein the attempting comprises automatically accepting the request signal for the device-to-device communication from the second electronic device using the identifier of included in the second message.

4. The method of claim 1, wherein the transferring the selected file to the second electronic device through the communication session comprises forwarding the selected file to the second electronic device through the communication session in response to the device-to-device communication not being set during a time period.

5. The method of claim 1, wherein the first message and the second message are processed as hidden information that is not exposed to users participating in a chatroom provided by the messaging service.

6. The method of claim 1, further comprising:
receiving the device information through broadcasting, the device information including identifiers of the peripheral devices that are configured to perform the device-to-device communication.

7. The file transfer method of claim 1, wherein the attempting includes attempting to set the device-to-device communication with the second electronic device for a period time.

8. A non-transitory computer-readable recording medium storing instructions that, when executed by a processor, cause the processor to implement a file transfer method in conjunction with an electronic device, the method comprising:

forwarding a first message including an identifier of a first electronic device connected to a communication session of a messaging service to a second electronic device connected to the communication session of the messaging service through the communication session in response to selecting a file to be transferred through the communication session;

retrieving, by the second electronic device, a specific identifier of the first electronic device from a list of peripheral devices capable of performing a device-to-device communication and stored in the second electronic device, using the identifier included in the first message;

receiving both (i) a second message including an identifier of the second electronic device and (ii) a request signal requesting the device-to-device communication with the first electronic device, the second message and the request signal being forwarded through the communication session from the second electronic device at a same time in response to the first message;

attempting to set the device-to-device communication between the first electronic device and the second electronic device using the identifier of the second electronic device; and transferring the selected file to the second electronic device through the set device-to-device communication in response to the device-to-device communication being set, and transferring the selected file to the second electronic device through the communication session in response to the device-to-device communication not being set, wherein the attempting comprises automatically accepting the request signal for the device-to-device communication from the second electronic device in response to the identifier included in the second message matching device information included in the request signal.

9. The non-transitory computer-readable recording medium of claim 8, wherein the attempting includes attempting to set the device-to-device communication between the first electronic device and the second electronic device for a period time.

10. A file transfer system of an electronic device, the file transfer system comprising:
a memory configured to store computer-readable instructions; and
at least one processor configured to execute the computer-readable instructions such that the at least one processor is configured to,
forward a first message including an identifier of a first electronic device connected to a communication session of a messaging service to a second electronic device connected to the communication session of the messaging service through the communication session of the messaging service in response to selecting a file to be transferred through the communication session,
cause the second electronic device to retrieve a specific identifier of the first electronic device from a list of peripheral devices capable of performing a device-to-device communication and stored in the second electronic device, using the identifier included in the first message,
receive both (i) a second message including an identifier of the second electronic device and (ii) a request signal requesting the device-to-device communication with the first electronic device, the second message and the request signal being forwarded through the communication session from the second electronic device at a same time in response to the first message, attempt to set the device-to-device communication with the second electronic device using the identifier of the second electronic device, and transfer the selected file to the second electronic device through the set device-to-device communication in response to the device-to-device communication being set, and transfer the selected file to the second electronic device through the communication session in response to the device-to-device communication not being set, wherein the at least one processor is further configured to automatically accept the request signal for the device-to-device communication from the second electronic device in response to matching between the identifier of the second electronic device included in the second message and device information included in the request signal.

11. The file transfer system of claim 10, wherein the at least one processor is configured to broadcast the identifier of the first electronic device for the device-to-device communication with the second electronic device.

12. The file transfer system of claim 10, wherein
the at least one processor is further configured to automatically accept the request signal for the device-to-device communication from the second electronic device using the identifier of the second electronic device included in the second message.

13. The file transfer system of claim 10, wherein
the at least one processor is further configured to cause the second electronic device to transmit the request signal for the device-to-device communication to the first electronic device, using the identifier of the first electronic device included in the first message.

14. The file transfer system of claim 10, wherein the at least one processor is configured to transfer the selected file to the second electronic device through the communication session by transferring the selected file to the second electronic device through the communication session in response to the device-to-device communication not being set during a time period.

15. The file transfer system of claim 10, wherein the at least one processor are further configured to process the first message and the second message as hidden information that is not exposed to users participating in a chatroom provided by the messaging service.

16. The file transfer system of claim 13, wherein the at least one processor is further configured to receive the device information through broadcasting, the device information including identifiers of the peripheral devices that are configured to perform the device-to-device communication.

17. The file transfer system of claim 10, wherein the at least one processor is further configured to attempt to set the device-to-device communication with the second electronic device for a period time.

* * * * *